UNITED STATES PATENT OFFICE 2,437,510

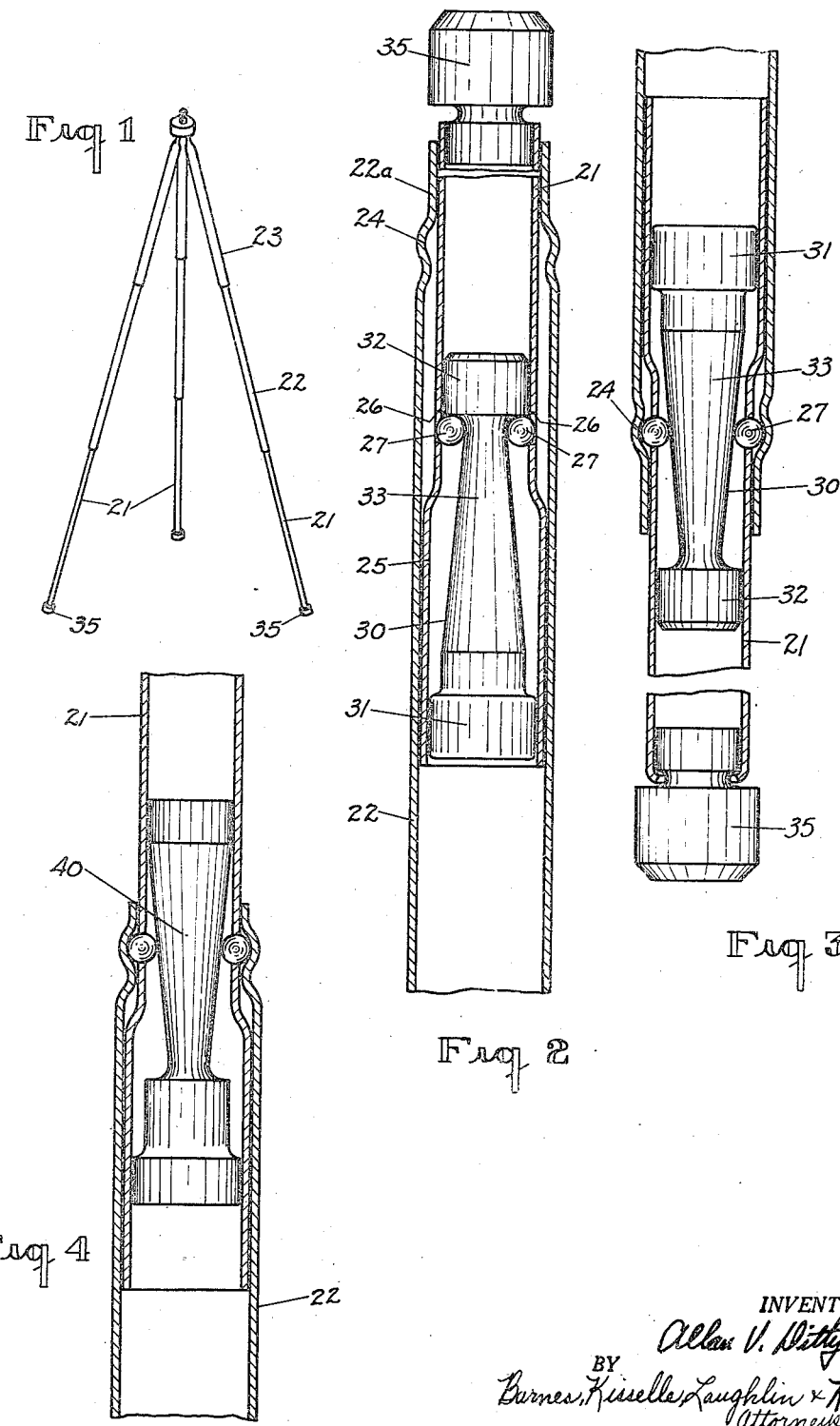

TELESCOPING JOINT

Allan V. Ditty, Detroit, Mich.

Application September 13, 1944, Serial No. 553,871

8 Claims. (Cl. 287—119)

This invention relates to a self-locking device for a telescoping tube joint.

It is an object of the present invention to provide a quick acting gravity controlled locking device for a telescoping joint for tubular supports such as camera tripods, or movie screen tripods or stand, music stands, fishing rods, radio antennas, etc.

Much effort has been expended in an attempt to design a conveniently operable joint for telescoping tubes. Various types of spring clips and other manually operated clamps have been designed but all of them require a certain manipulation for their operation and are apt to be subject to inconsistency in locking, as well as, wear and slipping after a certain amount of use.

The present invention contemplates a locking joint which is controlled by gravity so the tube may be readily extended and simply inverted and telescoped without the need of fumbling or fussing with manually operated controls or friction devices.

Other objects and features of the invention relating to details of construction will be brought out in the following description and claims.

In the drawings:

Fig. 1 illustrates a tripod arrangement in which the joint may be used.

Fig. 2 is a sectional view of the joint in telescoped position.

Fig. 3 is a similar view showing the joint in extended locked position.

Fig. 4 is another embodiment of the joint showing a reversal of the parts.

In Fig. 1 it will be seen that each leg of the tripod is made up of increasing diameter tubes 21, 22 and 23. The joint itself is illustrated in Fig. 2 where portions 21 and 22 are illustrated in telescoped relation. The tube 22 is ensmalled at 22a so that it fits snugly around the tube 21. An annular pocket 24 is also formed just above this ensmalled portion. The tube 21 is enlarged at 25 so that it slides freely within the tube 22. Adjacent the enlarged portion, but spaced therefrom, opposed holes 26 are found in the inside tube. The balls 27 are located in these holes and each is made with a diameter which is greater than the thickness of the wall of the tube 21.

Within the assembly is a plunger 30 having a cylindrical portion 31 at one end to give it a bearing surface in the enlarged portion of the small tube 21 and a bearing surface 32 at the other end to fit into the normal portion of the small tube. Between these bearing portions 31 and 32 is a tapered portion 33 which, when positioned as shown in Fig. 2, is supported by the balls 27 and also permits them to ride inwardly of holes 26 in tube 21. When the tube assembly is reversed so that portion 31 of plunger 30 is on top and portion 32 is on the bottom (as shown in Fig. 3) gravity will draw the plunger down and force the balls 27 outwardly through the holes 26. In this position as the tubes are extended the balls 27 will be received in the annular pocket 24 of the outer tube, thus locking the joint in position.

In opening the tubes, it will be seen that when the joint is held in upside down position the balls are adjacent the narrow end of plunger 33 and can readily move inward as shown in Fig. 2. In other words, the balls are released and incapable of interlocking tubes 21 and 22. The tubes may then be readily extended and if desired stop means may be provided to limit the opening movement. When the tubes are then placed in upright position with the contact portions 35 on the ground, the plunger 33 will gravitate to position where it will force the balls 27 outward where they will interengage the annular groove 24 of the larger tube. When it is desired to telescope the tubes, the assembly may be simply inverted so that the plunger assumes the position of Fig. 2. The balls will then be free to move inwardly and the tubes can be readily telescoped. A foot portion 35 serves as a friction contact and also limits the collapsing movement of tube 21.

In Fig. 4 a similar construction is shown except that the plunger 40 is reversed with relation to the tubes so that in the locked position the tube diameter will progress from large to small rather than from small to large. Apart from the fact that the shape of the plunger 40 is altered somewhat, the construction as well as the function of the mechanism is otherwise the same.

What I claim is:

1. The combination comprising telescoped tubes, a freely slidable gravity actuated plunger within the inner tube having a tapered portion, and means actuated by the tapered portion of the plunger to interengage the tubes when the tubes are positioned so that the plunger tapers upwardly and outwardly with respect to said tubes and releasable when said tubes and plunger are inverted so that the plunger tapers upwardly and inwardly with respect to said tubes.

2. A gravity controlled locking joint for telescoping tubes comprising a freely slidable gravity actuated plunger within the inner tube, the plunger having a tapered portion, the inner tube having opposed holes therein, balls in said holes arranged to contact said tapered portion of said plunger, each having a diameter greater than the thickness of the wall of the inner tube, and an annular recess in the inner surface of the outer tube to receive a portion of said balls to lock said tubes against longitudinal movement when the tube is vertically disposed to cause the weight and tapered portion of the plunger to force the balls outward.

3. A gravity locking device for a telescoping tube joint comprising two tube sections slidable in telescoping relation, the wall of the inner tube having one or more openings, a locking member located in each opening having at least one dimension greater than the thickness of the wall of the inner tube, a recess formed in the inner face of the outer tube to receive a portion of the locking member when in its locking position, and a gravity actuated locking plunger within said inner tube, said plunger being tapered between its ends and moving in response to gravity within said inner tube in one direction to force the locking members outwardly against the outer tube and movable in response to gravity within said inner tube in the opposite direction to release said locking members and to provide a confining cavity to receive the locking members.

4. A gravity lock joint for a telescoping tube assembly comprising a plurality of telescoped tubes, the wall of the inner tube having one or more holes therein, the wall of the outer tube having recesses in the inside face, a gravity actuated locking plunger having enlarged portions at opposite ends to serve as slides in said inner tube and having a tapered portion between said enlarged portions, and one or more locking pieces located in the holes in the wall of the inner tube shiftable outwardly to a position projecting beyond the outer face of said inner tube into the locking recesses in the inside face of the outer tube by the weight and taper of the plunger, and shiftable within the confines of the inner tube when the assembly is reversed to permit telescoping movement.

5. A gravity controlled locking joint for telescoping tubes comprising two tubes telescoped one within the other, an enlarged portion on the smaller tube adapted to fit within the inside of the larger tube, a reduced portion on the larger tube adapted to have a sliding relation with the smaller tube, means positioned to pass through the wall of the smaller tube to interengage the outer tube for locking the tubes against relative movement, and gravity actuated means within the tubes shiftable in one direction in response to gravity when the tubes are positioned lower end down to engage said locking means and actuate the same to locking position and shiftable in the opposite direction in response to gravity when the tubes are positioned lower end up to release said locking means.

6. In combination two telescoping tubes, the inner of said telescoped tubes having an opening in the wall thereof, a clutch member located in said opening, and a gravity actuated clutch engaging member housed entirely within said tube and constructed and arranged so that when the tubes are positioned upper end down the clutch engaging member releases said clutch member whereby the tubes are freely slidable one with respect to the other and when the tubes are positioned lower end down the gravity actuated clutch engaging member responds to gravity and causes said clutch member to interengage the said tubes and lock them together.

7. The combination as set forth in claim 6 wherein the gravity actuated clutch engaging member has a surface which is tapered lengthwise of the tube and adapted to operatively engage the said clutch member to force the same outwardly to interengage the two tubes when the lower end of the tube is positioned downwardly.

8. In combination a pair of tubes telescoped one within the other, the inner tube having an opening therein, a clutch member positioned in said opening, a gravity actuated weight within said inner tube and freely movable lengthwise therein and having a tapered surface which co-acts with said clutch member to retain the same in said opening, stop means on said weight co-acting with said clutch member to limit the travel of said weight in said tube whereby the tapered surface of said weight is always positioned adjacent said clutch member, and a co-operating clutch means carried by the outer tube whereby when the said tubes are extended so that the clutch member and clutch means are in juxtaposition and the lower end of the tubes is positioned downwardly then the said weight responds to gravity and its tapered surface moves the said clutch member into interengagement with its cooperating clutch means whereby the said tubes are locked together.

ALLAN V. DITTY.

REFERENCES CITED

The following references are of record in the file of this patent:

UNITED STATES PATENTS

| Number | Name | Date |
|---|---|---|
| 389,844 | Kintz | Sept. 18, 1888 |
| 1,457,964 | Doty | Jan. 5, 1923 |
| 1,811,281 | Shroyer | June 23, 1931 |

FOREIGN PATENTS

| Number | Country | Date |
|---|---|---|
| 227,920 | Germany | Oct. 31, 1910 |
| 405,405 | France | Dec. 30, 1909 |
| 513,733 | Great Britain | Oct. 20, 1939 |
| 592,023 | Germany | Jan. 31, 1934 |